United States Patent [19]
Wadleigh
[11] 4,072,879
[45] Feb. 7, 1978

[54] TURN-OFF INTERLOCK FOR TAPE AND FILM MACHINES

[76] Inventor: Edward R. Wadleigh, Star Rte. Box 279, Hemet, Calif. 92343

[21] Appl. No.: 672,925

[22] Filed: Apr. 2, 1976

[51] Int. Cl.[2] .............................................. B65H 59/38

[52] U.S. Cl. ........................................ 318/57; 318/60; 318/369; 318/87

[58] Field of Search .................... 318/6, 7, 57, 62, 364, 318/365, 369, 60, 63, 87

[56] References Cited

U.S. PATENT DOCUMENTS

| | | | |
|---|---|---|---|
| 2,938,677 | 5/1960 | Flan et al. | 318/63 X |
| 3,059,160 | 10/1962 | Posselt | 318/57 |
| 3,218,529 | 11/1965 | Evans et al. | 318/87 X |
| 3,269,670 | 8/1966 | Brian, Jr. et al. | 318/7 X |
| 3,965,401 | 6/1976 | Jones | 318/6 |

*Primary Examiner*—B. Dobeck
*Attorney, Agent, or Firm*—Sughrue, Rothwell, Mion, Zinn and Macpeak

[57] ABSTRACT

An interlock circuit is provided for tape and film machines which, when the high speed forward or reverse motors are in operation, prevents the main power from being turned off even though the operator might actuate the power switch. Instead of the power going off when the main power switch is operated during high speed operation, the machine continues to operate until the operator takes his hand off the fast forward or reverse drive switch, and then the brake is energized to stop the motion of the film or tape. When the brake cycle is complete, the power is then automatically turned off.

2 Claims, 1 Drawing Figure

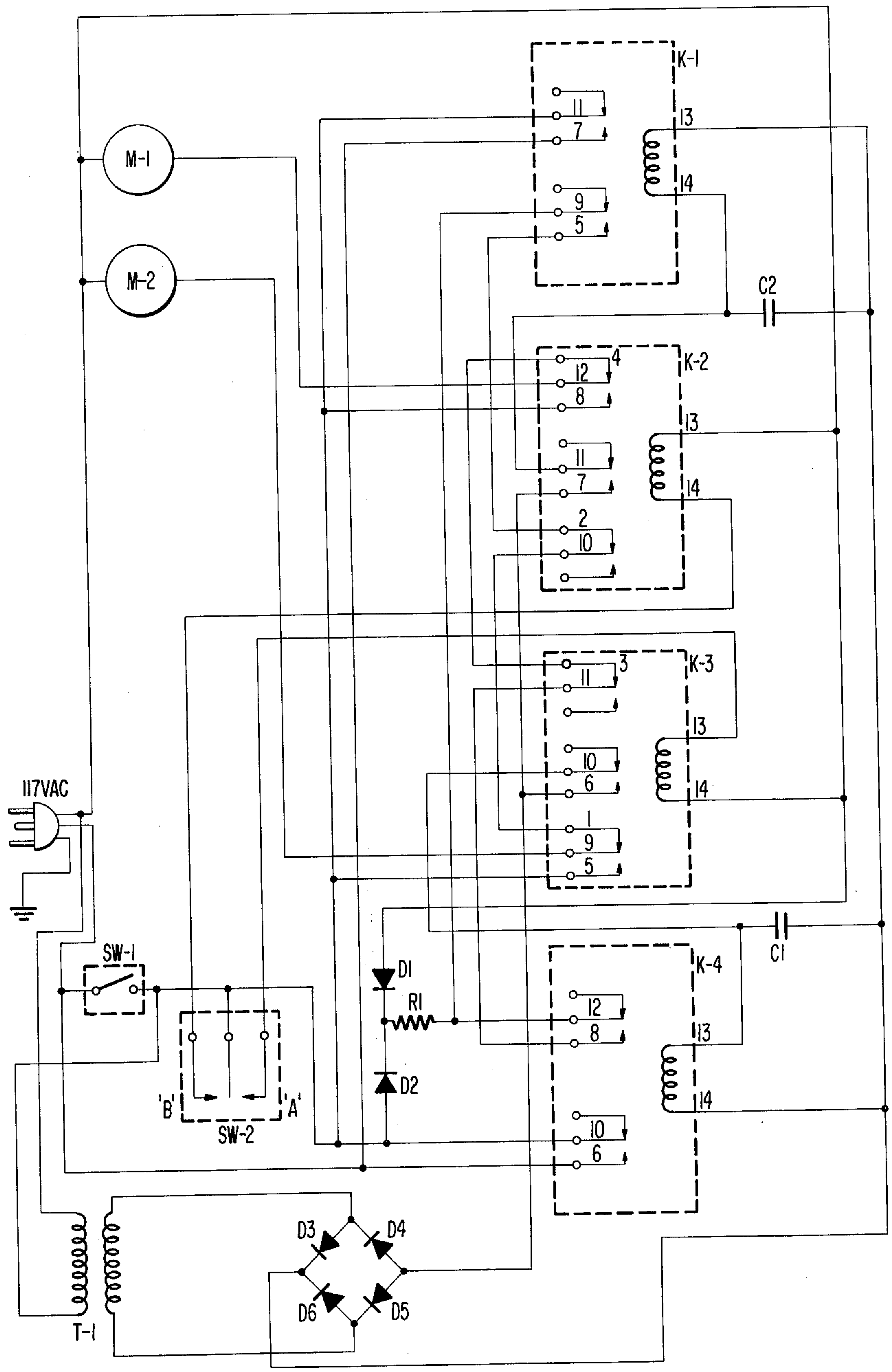
K-1
11
7
13
9
5
14
M-1
M-2
C2
K-2
4
12
8
13
11
7
14
2
10
K-3
3
11
13
10
6
14
1
9
5
117VAC
C1
K-4
D1
R1
12
8
13
SW-1
D2
14
'B'
'A'
10
6
SW-2
D3
D4
D6
D5
T-1

TURN-OFF INTERLOCK FOR TAPE AND FILM MACHINES

BACKGROUND OF THE INVENTION

The present invention generally relates to the control circuits of film or tape transport machines, and more particularly to a power interlock circuit for preventing the main power from being turned off while the high speed forward or reverse motors of the film or tape machine are running.

In microfilm readers or audio or video tape transports or similar devices, there is a problem when the film or tape is being moved in either the forward or reverse direction by the high speed motors of the transport and the operator turns off the power switch. Due to the inertia of the high speed motors and reels and a lack of power to operate the brake, overrun of the film or tape inevitably results causing great problems inside the machine and many jam ups. At the very least, the film or tape might have to be rewound by hand and often serious damage results to the film or tape and occasionally to the transport mechanism.

SUMMARY OF THE INVENTION

The present invention provides an interlock circuit for film and tape machines which, when the high speed forward or reverse motors are in operation, prevents the main power from being turned off even though the operator might actuate the switch. This is accomplished by providing relay contacts in shunt with the main power switch, and these relay contacts are closed when the high speed forward or reverse switch is closed by the operator. The relay contacts are part of a time delay relay which maintains power to the machine for a predetermined time after the high speed forward or reverse switch is released by the operator. When the main power switch has been opened and after the high speed forward or reverse switch has been released by the operator, a brake cycle is initiated to stop the motion of the high speed motors. After the brake cycle is completed, power is automatically turned off to the machine.

BRIEF DESCRIPTION OF THE DRAWING

The foregoing objects, aspects, uses and advantages of the invention will be described in more detail hereinafter with reference the drawing in which the sole FIGURE is a simplified schematic diagram illustrating a preferred embodiment of the interlock circuit according to the invention.

DESCRIPTION OF THE PREFERRED EMBODIMENT

The schematic diagram shown in the FIGURE has been simplified for purposes of clarity of explanation. It will be understood, for example, that a film or tape machine to which the invention may be advantageously applied may include slow speed reverse and/or forward motors as well as a slow speed switch for actuating these motors and solenoids for operating various devices of the transport mechanism such as film plates, capstans, pressure pads or the like. The embodiment shown in the FIGURE is an application of the invention to a transport mechanism having separate high speed motors for forward and reverse travel of the film or tape. It will, of course, be obvious to those skilled in the art that the invention could be practiced with other and different transport mechanisms using, for example, a single high speed motor for both forward and reverse directions through a suitable transmission.

Referring more specifically to the drawing, power is conventionally supplied to the film or tape machine through a grounded plug connected to a single phase supply of 117VAC. One of the power lines from the plug is provided with a single pole, single throw power switch SW-1. Switch SW-1 is connected to the center terminal of a single pole, double throw switch SW-2. The switch SW-2 is the high speed forward or reverse switch and may typically take the form of a spring biased switch which returns to a center or off position when released by the operator. When switch SW-2 is in the "A" position, power is supplied to the coil of relay K-3 thereby energizing the relay and causing the switch blade contacts of the relay to make contact with the second of two corresponding stationary contacts.

The switch SW-1 is also connected in the primary circuit of a power transformer T-1. The secondary winding of transformer T-1 provides a low voltage 24VAC output which is connected across a diode bridge rectifier comprising diodes D3 through D6. The rectified output voltage from the diode bridge is supplied through contacts 6 and 10 of relay K-3 to the coil of relay K-4. A capacitor C1 is connected in shunt with the coil of relay K-4. Thus, when relay K-3 is energized, relay K-4 is also energized, and the capacitor C1 is charged through the rectified output from the diode bridge. Energization of the coil of relay K-4 causes the switch blade contacts to make contact with the second of two corresponding fixed contacts. In so doing, contacts 10 and 6 of relay K-4 are connected in shunt with the power switch SW-1.

Energization of relay K-3 also supplies power through contacts 9 and 5 to high speed motor M-2. Under this condition, high speed motor M-2 acts as the take up drive motor while high speed motor M-1 which is unenergized, acts as an inertia brake on the supply reel to maintain proper tension on either the film or the tape.

Now, when the operator releases the switch SW-2, power is no longer supplied to the coil of relay K-3 causing this relay to be de-energized. The braking of contacts 10 and 6 of relay K-3 interrupts the power supplied to the coil of relay K-4 from the diode bridge; however, the charge on capacitor C1 maintains the energization of the coil of relay K-4 for a predetermined time. This time period is a function of capacitance value of capacitor C1, the resistance of the coil of relay K-4 an the voltage applied across capacitor C1. With relay K-3 de-energized, power to high speed motor M-2 previously supplied through contacts 9 and 5 is interrupted. In addition, while relay K-4 remains energized, half-wave rectified power is supplied through diode D2 and resistor R1 through relay contacts 12 and 8 of relay K-4, contacts 11 and 3 of relay K-3, and relay contacts 12 and 4 of relay K-2 to high speed motor M-1. This half-wave rectified dc power to the high speed motor M-1 causes that motor to act as an electrodynamic brake. When the brake cycle has been completed, i.e., the motion of the film or tape has been stopped through the braking action of motor M-1, the charge across capacitor C1 will have decreased to such a value as to be insufficient to maintain the relay K-4 in an energized state. When this happens, contacts 10 and 6 of relay K-4 brake thereby removing the shunt connection across the power switch SW-1.

It will be understood from the foregoing that, during the high speed power and brake cycles, the machine power can not be turned off because contacts 10 and 6 of relay K-4 are in shunt with the power switch SW-1. This prevents any damage which might otherwise be caused by opening the power switch SW-1 while the machine is operated in a high speed mode or before the braking cycle following a high speed mode has been completed.

Operation of the interlock circuit is similar to that just described when the switch SW-2 is in position "B". Specifically, relay K-2 is energized thereby connecting the rectified output of the diode bridge across the coil of relay K-1 through contacts 11 and 7 of relay K-2. Again, a capacitor C2 connected in shunt with the coil of relay K-1 is charged by the fullwave rectified output of the diode bridge. This time, power is supplied to high speed motor M-1 through contacts 12 and 8 of relay K-2, and the power switch SW-1 is shunted by the contacts 11 and 7 of relay K-1.

Now, when switch SW-2 is released by the operator, relay K-2 is de-energized removing power from high speed motor M-1. As with relay K-4, relay K-1 remains energized for a predetermined period of time due to the charge on capacitor C2. Halfwave rectified power is supplied from diode D1 and resistor R1 through contacts 9 and 5 of relay K-1, contacts 2 and 10 of relay K-2, and contacts 1 and 9 of relay K-3 to high speed motor M-2. As a result, high speed motor M-2 acts as an electrodynamic brake which stops the motion of film or tape. Then, when the charge across capacitor C2 has decreased to a certain value, relay K-1 becomes de-energized permitting power to the machine to be turned off in the normal manner.

It will be apparent that the embodiment shown is only exemplary and that various modifications can be made in construction and arrangement within the scope of the invention as defined in the appended claims. For example, depending on the machine to which the invention may be advantageously applied, the interlock circuit need not operate a brake but could operate any other safety of operational part of the machine.

I claim:

1. In a film ot tape machine having a power switch for supplying power to the machine, high speed drive means for driving film or tape, and a high speed drive switch connected in series with said power switch to cause power to be supplied to said high speed drive means, a power interlock circuit comprising:

a first relay having first switch contacts and second switch contacts and a coil, said coil being connected to said high speed drive switch to be energized by the operation thereof, and said first switch contacts being connected between said power switch and said high speed drive means to supply power thereto when said coil is energized, a first source of rectified voltage, a second relay having first switch contacts and a coil, said second switch contacts of said first relay being connected between said first source of rectified voltage and the coil of said second relay to supply power thereto when said first relay coil is energized, said first contacts of said second relay being connected in shunt with said power switch, a first capacitor connected across the coil of said second relay, said high speed drive means comprising first and second high speed motors for driving film or tape in forward and reverse directions, respectively, said first high speed motor being connected to receive power from first switch contacts of said first relay, said interlock circuit further comprising:

a third relay having first switch contacts and second switch contacts and a coil, said coil being connected to said high speed drive switch to be energized by the operation thereof, the energization of the coils of said first and third relays being mutually exclusive, and said first switch contacts being connected between said power switch and said second high speed motor to supply power thereto when said coil is energized, a fourth relay having first switch contacts and a coil, said second switch contacts of said third relay being connected between said first source of rectified voltage and the coil of said fourth relay to supply power thereto when said third relay coil is energized, said first contacts of said second relay being connected in shunt with said power switch, a second capacitor connected across the coil of said fourth relay, said first relay having third switch contacts, said second relay having second switch contacts, said third relay having third switch contacts, and said fourth relay having second switch contacts, said interlock circuit further comprising:

first brake means for stopping said second high speed motor, said third switch contacts of said first relay and said second switch contacts of said second relay being connected in series between said power switch and said first brake means to supply power thereto when the coil of said first relay is unenergized and the coil of said second relay is energized, and second brake means for stopping said first high speed motor, said third switch contacts of said third relay and said second switch contacts of said fourth relay being connected in series between said power switch and said second brake means to supply power thereto when the coil of said third relay is unenergized and the coil of said fourth relay is energized.

2. The power interlock as recited in claim 1, wherein said first brake means comprises a second source of rectified voltage which is connected by said third switch contacts of said first relay and said second switch contacts of said second relay to said second high speed motor to cause said second high speed motor to act as an electrodynamic brake, and said second brake means comprises a third source of rectified voltage which is connected by said third switch contacts of said third relay and said second switch contacts of said fourth relay to said first high speed motor to cause said first high speed motor to act as an electrodynamic brake.

* * * * *